United States Patent
Haga (10) Patent No.: US 9,654,665 B2
(45) Date of Patent: May 16, 2017

(54) IMAGE FORMING APPARATUS

(71) Applicant: KONICA MINOLTA, INC., Chiyoda-ku, Tokyo (JP)

(72) Inventor: Tatsuyoshi Haga, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/975,103

(22) Filed: Dec. 18, 2015

(65) Prior Publication Data
US 2016/0212299 A1   Jul. 21, 2016

(30) Foreign Application Priority Data

Jan. 16, 2015 (JP) .................. 2015-006965

(51) Int. Cl.
*H04N 1/00* (2006.01)
*H04N 1/387* (2006.01)

(52) U.S. Cl.
CPC ......... *H04N 1/3876* (2013.01); *H04N 1/0032* (2013.01); *H04N 1/0057* (2013.01); *H04N 1/00204* (2013.01); *H04N 2201/0094* (2013.01)

(58) Field of Classification Search
USPC ....................................... 358/1.18
See application file for complete search history.

(56) References Cited

U.S. PATENT DOCUMENTS

| | | | |
|---|---|---|---|
| 8,848,225 | B2 | 9/2014 | Kurihara |
| 2006/0126097 | A1* | 6/2006 | Toyonori ........... H04N 1/00037 358/1.14 |
| 2006/0139698 | A1* | 6/2006 | Kowada ............. H04N 1/00846 358/437 |
| 2009/0027702 | A1 | 1/2009 | Sakai |
| 2013/0120490 | A1* | 5/2013 | Nakajima .............. B41J 29/393 347/19 |
| 2015/0003845 | A1 | 1/2015 | Morishita |

FOREIGN PATENT DOCUMENTS

| | | |
|---|---|---|
| JP | 2008186146 A | 8/2008 |
| JP | 2012255843 A | 12/2012 |
| JP | 2015012532 A | 1/2015 |

OTHER PUBLICATIONS

Sakai Takaaki, Image Forming Apparatus, Aug. 14, 2008, Machine Translated Japanese Patent Application Publication (Applicant Admitted Prior Art Listed on IDS), JP2008186146, All Pages.*
Japanese Office Action (and English translation thereof) dated Mar. 15, 2017 issued in counterpart Japanese Application No. 2015-006965.

* cited by examiner

*Primary Examiner* — Ngon Nguyen
(74) *Attorney, Agent, or Firm* — Holtz, Holtz & Volek PC (57) ABSTRACT

An image forming apparatus including: a conveying unit that conveys a transfer medium; an image forming unit that prints an image on the transfer medium based on an image for printing; and a control unit that receives a detection result of an image detection unit that detects the image printed on the transfer medium, wherein the control unit has a determination function used when an image for which image detection is possible and an image for which image detection is not possible are added to a document image to form the image for printing, the determination function being adapted to exclude an area of the image for which image detection is possible and to determine a state of the printed image based on comparison of information of the detected image and information of the image for printing.

19 Claims, 11 Drawing Sheets

DOCUMENT IMAGE   GROUND TINT IMAGE   OUTPUT MATTER   COPY OF OUTPUT MATTER

FIG.6

READ IMAGE ⟺ IMAGE FOR PRINTING - GROUND TINT VISIBLE PART (DOT AREA)

COMPARE

FIG.8

DOCUMENT IMAGE    GROUND TINT        ESTIMATED READ IMAGE    READ IMAGE
                  VISIBLE PART

IMAGE FORMING APPARATUS

CROSS-REFERENCE TO RELATED APPLICATIONS

The present application claims priority under 35 U.S.C. §119 to Japanese Patent Application No. 2015-006965, filed Jan. 16, 2015. The contents of this application are incorporated herein by reference in their entirety.

BACKGROUND OF THE INVENTION

Field of the Invention

The present invention relates to an image forming apparatus that can determine an image printed on a transfer medium.

Description of the Related Art

In an image forming apparatus, such as a copying machine, a printer, and a multifunction machine, printing is performed by forming toner images on photoreceptors included in an image forming unit based on image data obtained by reading the image data from a document reading apparatus, transferring the toner images to sheets fed from a tray, and fixing the toner images.

The fixing device passes the sheets to a fixing roller, a pressure belt, and the like and fixes the toner images on the sheets by heat, pressure, and the like. Sheets provided with images are conveyed to the fixing device. Therefore, in some cases, fixing members, such as the fixing roller and the pressure belt, are stained by toner over time, or the toner is attached to the fixing members by a jam of a sheet. When a sheet is newly passed to the fixing device, the toner of the fixing members is attached to the sheet, and the sheet is stained.

In some cases, the image density changes over time. Depending on the degree of the stain or the change in the image density, the abnormality of image reduces the print quality, and automatic detection of the abnormality is desired to prevent the generation of a defective product.

Japanese Patent Laid-Open No. 2012-255843 has a function of checking incorrect collating or missing pages by comparing check data (checksum) of image data (during writing) of a first copy (or during check print) and image data of second and subsequent copies, and variable areas and stamp areas that are different in each copy are not checked. In other words, the comparison is based on check data of images in which images of the areas are removed. However, this apparatus checks the write image data, and the apparatus cannot detect a stain of a printed sheet, an abnormality of image density, or the like.

Meanwhile, an image forming apparatus is proposed that reads an image of a printed sheet and compares the image and a document image to determine the quality of a printed image.

However, in comparison of the printed image and the document image for detection of a stain or a blur (waste detection), when an image of a stamp or the like is added to the document image, the part does not match, and the part is determined to be a stain. To prevent this, it is possible not to compare the stamp areas.

An example of addition of an image to a document image includes ground tint printing (for example, Japanese Patent Laid-Open No. 2008-186146). In the ground tint printing, a ground tint image including a combination of maintained dots and deleted dots is placed over the document image to generate an output matter. When the output matter is further copied, the small deleted dots become invisible, and the maintained dots are revealed. In this way, a copy can be determined.

For example, the ground tint is an image in which characters, such as "copying prohibited", are revealed when copied (scanned). The ground tint is an image including an image of "copying prohibited" or the like and small dots for making the image inconspicuous, and the small dots are added to the entire surface of the sheet. In reading by a scanner, the small dots are not read (dots are that small), and "copying prohibited" that is inconspicuous in the original becomes conspicuous when copied (scanned) and can be viewed as if to be revealed. Conversely, an image of "copying prohibited" or the like can be formed by small dots, and other characters can be designed to be revealed. When the image is copied (scanned), "copying prohibited" or the like becomes white on a colored background.

However, when the printed image is detected to compare the detected image and the document image, not comparing the added area is not suitable because the ground tint is added to the entire surface (entire surface is not compared).

An additional image can be combined with the document image to compare the image and the printed image. However, small dots are not detected by scanning in the case of the ground tint, and it is determined that there is a blur in the printed image. Other than when the ground tint is added, these problems similarly occur when the document image includes an image not detected by scanning.

The present invention has been made in view of the circumstances, and an object of the present invention is to provide an image forming apparatus that can use information of a printed image and information of an image for printing to determine the printed image when the image for printing includes an image for which image detection is not possible.

SUMMARY OF THE INVENTION

To achieve at least one of the abovementioned objects, an image forming apparatus reflecting one aspect of the present invention includes:

a conveying unit that conveys a transfer medium;

an image forming unit that prints an image on the transfer medium based on an image for printing; and a control unit that receives a detection result of an image detection unit that detects the image printed on the transfer medium, wherein the control unit has a determination function used when an image for which image detection is possible and an image for which image detection is not possible are added to a document image to form the image for printing, the determination function being adapted to remove an area of the image for which image detection is possible and to determine a state of the printed image based on comparison of information of the detected image and information of the image for printing.

To achieve at least one of the abovementioned objects, an image forming apparatus reflecting one aspect of the present invention includes:

a conveying unit that conveys a transfer medium;

an image forming unit that prints an image on the transfer medium based on an image for printing; and a control unit that receives a detection result of an image detection unit that detects the image printed on the transfer medium, wherein the control unit has a determination function used when the image for printing includes an image for which image detection is not possible, the determination function being adapted to set, as comparison information, information of an image obtained by excluding the image for which image detection is not possible from the image for printing and to determine a state of the printed image based on comparison of information of the detected image and the comparison information.

To achieve at least one of the abovementioned objects, an image forming apparatus reflecting one aspect of the present invention includes:

a conveying unit that conveys a transfer medium;

an image forming unit that prints an image on the transfer medium based on an image for printing; and a control unit that receives a detection result of an image detection unit that detects the image printed on the transfer medium, wherein the control unit has a first determination function used when an image for which image detection is possible and an image for which image detection is not possible are added to a document image to form the image for printing, the first determination function adapted to remove an area of the image for which image detection is possible and to determine a state of the printed image based on comparison of information of the detected image and information of the image for printing, the control unit has a second determination function used when the image for printing includes an image for which image detection is not possible, the second determination function adapted to set, as comparison information, information of an image obtained by excluding the image for which image detection is not possible from the image for printing and to determine a state of the printed image based on comparison of information of the detected image and the comparison information, and the control unit can select the first determination function and the second determination function.

In the image forming apparatus according to the abovementioned aspect, it is preferable that information of an image obtained by erasing the image for which image detection is not possible from the image for printing is set as the comparison information.

In the image forming apparatus according to the abovementioned aspect, it is preferable that an image for which image detection is possible and an image for which image detection is not possible are added to a document image to form the image for printing.

In the image forming apparatus according to the abovementioned aspect, it is preferable that the image for which image detection is possible and the image for which image detection is not possible are ground tint images.

In the image forming apparatus according to the abovementioned aspect, it is preferable that the control unit sets, as the comparison information, an image in which the image for which image detection is not possible is not added to the document image.

In the image forming apparatus according to the abovementioned aspect, it is preferable that the control unit compares the information of the detected image and information of the document image when the image is determined to have a defect, and the control unit determines that printing of the detected image has a defect when the control unit determines that the images match.

In the image forming apparatus according to the abovementioned aspect, it is preferable that the control unit issues a warning when an image for which image detection is predicted to be not possible is detected in the determination of the image.

In the image forming apparatus according to the abovementioned aspect, it is preferable that an image detection unit that detects an image printed on the transfer medium in a downstream in a conveyance direction of the image forming unit.

DETAILED DESCRIPTION OF THE PREFERRED EMBODIMENTS

An embodiment of the present invention will now be described.

Figure 1:
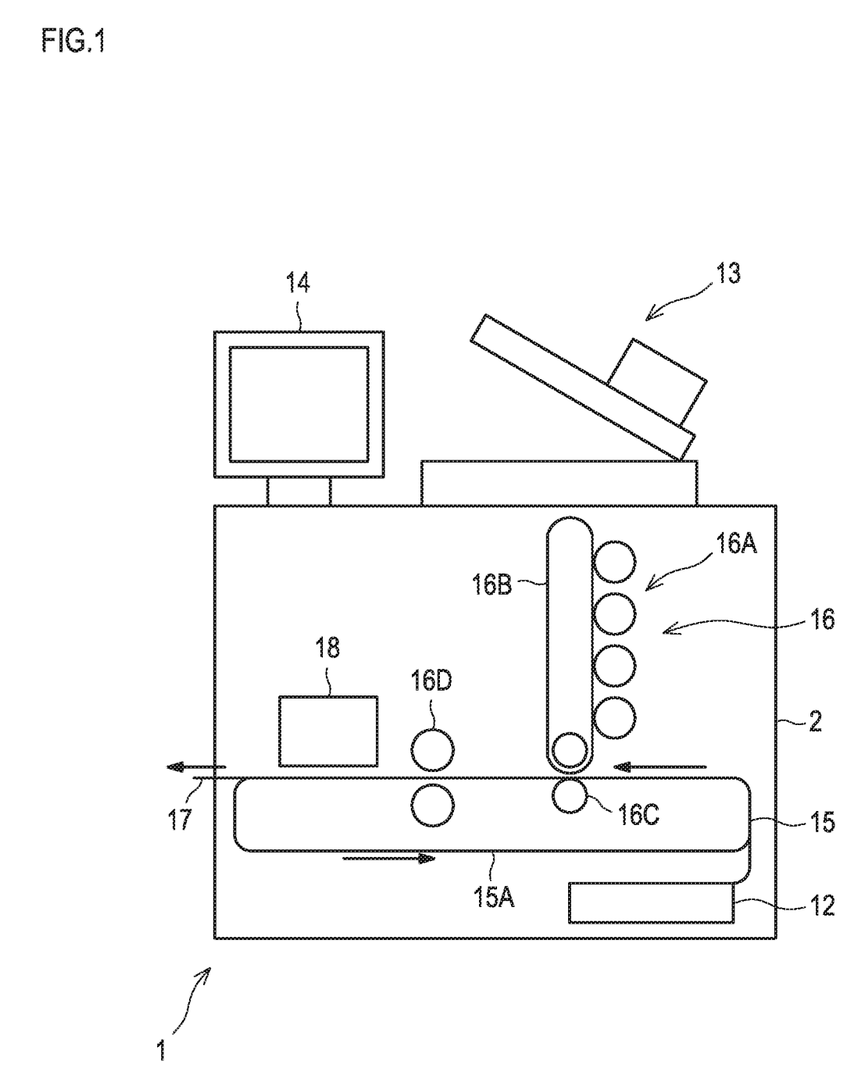
FIG. 1 is a diagram showing a mechanical outline of an image forming apparatus according to an embodiment of the present invention.

A mechanical outline of an image forming apparatus 1 according to the embodiment of the present invention will be described with reference to FIG. 1.

Figure 2:
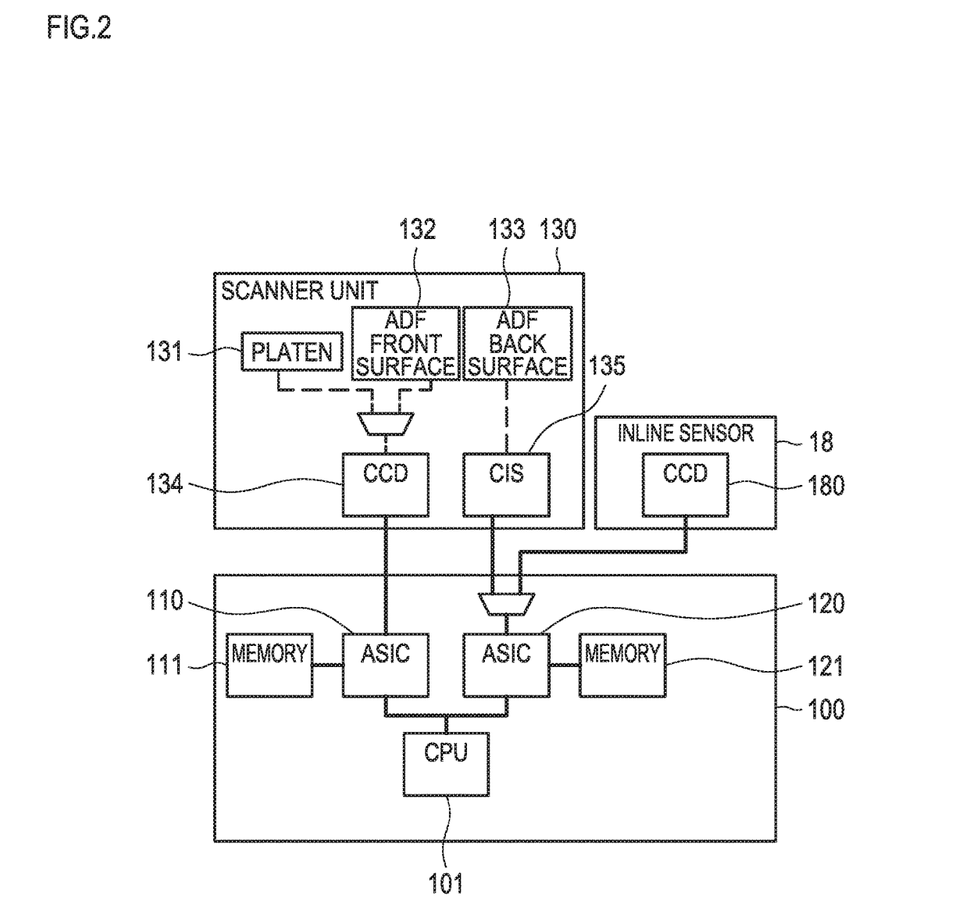
FIG. 2 is a diagram showing part of a substrate configuration of the image forming apparatus according to the embodiment of the present invention.

The image forming apparatus 1 includes an automatic document feeder (ADF) 13 on an upper side of an image forming apparatus body 2, and a scanner unit 130 shown in FIG. 2 can read an image of a document fed by the automatic document feeder (ADF) 13. The document can also be read on a platen glass 131.

A display unit 14 is installed on a part where the platen glass 131 is not located on the upper side of the image forming apparatus body 2. The display unit 14 includes an LCD and a touch panel and can display operation of a user and information. In the embodiment, the display unit 14 has both of the functions of operation and display. An operation unit including a mouse, a tablet, or the like can be provided separately from the display unit.

A paper feed tray 12 that houses sheets to feed paper is arranged on a lower side of the image forming apparatus body 2. The paper feed tray 12 can include multiple stages. In the embodiment, the sheets are equivalent to a transfer medium of the present invention. The transfer medium is not limited to the sheets. The material of the transfer medium is not limited as long as the transfer medium can be conveyed after printing of an image.

A conveyance path 15 for conveying the sheets fed from the paper feed tray 12 is provided in the image forming apparatus body 2, and an image forming unit 16 is provided in the middle of a conveyance route in the image forming apparatus body 2. The image forming unit 16 includes photoreceptors 16A of each color, an intermediate transfer belt 16B, and a secondary transfer unit 16C. Chargers, LDs, and developing devices not shown are arranged for each color around the photoreceptors 16A. A fixing device 16D is arranged on the conveyance path 15 in a downstream of the secondary transfer unit 16C. In the embodiment, the conveyance path 15 forms a conveying unit of the present invention, along with a conveyance roller, a drive motor, and the like not shown.

In the downstream of the fixing device 16D, the conveyance path 15 is extended and connected to a paper discharge unit 17. The paper discharge unit 17 can be formed by installing a paper discharge tray or the like, or the paper discharge unit 17 can be connected to a conveyance path of a post-processing apparatus not shown.

The conveyance path 15 includes a reverse conveyance path 15A that branches in the downstream of the fixing device 16D and that merges with the conveyance path 15 in the upstream of the image forming unit 16. The reverse conveyance path 15A includes a mechanism (not shown) that reverses the sheets. The sheets reversed by the reverse conveyance path 15A are returned to the conveyance path 15 in the upstream of the image forming unit 16 through the reverse conveyance path 15A, and images can be printed on back surfaces of the sheets.

In the image forming unit 16, the chargers uniformly charge the surfaces of the photoreceptors 16A before writing of an image, and an image writing unit forms electrostatic latent images on the photoreceptors 16A by applying a laser or the like to the photoreceptors 16A with the uniformly charged surfaces. The developing devices use toner materials to develop the electrostatic latent images formed on the photoreceptors 16A. Toner images are formed on the photoreceptors 16A through the development process. The toner images of the photoreceptors 16A are transferred to the intermediate transfer belt 16B, and the secondary transfer unit 16C transfers the toner images to the sheets conveyed from the paper feed tray 12. The sheets with the transferred toner images are conveyed along the conveyance path 15 and reach the fixing device 16D.

A cleaning unit not shown removes toner members remained on the photoreceptors 16A and the intermediate transfer belt 16B.

The fixing device 16D heats the conveyed sheets to fix the toner images transferred to the front surfaces of the sheets to form output images. The fixation completes printing of the images on the sheets.

The sheets after the fixing process are discharged to the paper discharge unit 17 through the conveyance path 15, or the sheets are returned to the conveyance path 15 in the upstream of the image forming unit 16 after the front and back are reversed through the reverse conveyance path 15A. The image forming unit 16 can print images on the back surfaces of the sheets in which the front and back are reversed.

An inline sensor 18 that detects the images of the sheets conveyed through the conveyance path 15 is installed between the fixing device 16D and a branch point of the conveyance path 15. In the embodiment, the inline sensor 18 is equivalent to an image detection unit of the present invention. A CIS (contact image sensor) or the like can be used as the image detection unit, and the arranged component is not limited to the inline sensor. The arranged component is not particularly limited as long as the images of the sheets can be detected.

FIG. 2 is a diagram showing an outline of a control substrate that mainly reads images in the image forming apparatus 1.

The scanner unit 130 includes the platen glass 131, an ADF front surface reading unit 132, and an ADF back surface reading unit 133. The platen glass 131 and the ADF front surface reading unit 132 enable image reading by a CCD 134, and the ADF back surface reading unit 133 enables image reading by a CIS 135.

The inline sensor 18 includes a CCD 180.

The CCD 134 is connected to an ASIC 110, and a memory 111 and a CPU 101 are connected to the ASIC 110.

The CIS 135 and the CCD 180 are connected to an ASIC 120, and a memory 121 and the CPU 101 are connected to the ASIC 120.

The CPU 101 executes a predetermined program to control the entire image forming apparatus 1.

In the embodiment, the CPU 101, the ASIC 110, the memory 111, the ASIC 120, and the memory 121 form a control unit 100.

In the control unit 100, the ASIC 110 receives the output of the CCD 134 and applies various reading processes, such as analog signal processing, A/D (Analog to Digital) conversion process, and shading process. The processed image information is stored as a document image in the memory 111, and the CPU 101 can control the ASIC 110 to read out the document image.

The ASIC 120 receives the outputs of the CCD 135 and the CCD 180 and applies various reading processes, such as analog signal processing, A/D (Analog to Digital) conversion process, and shading process. The processed image information is stored as a document image or a detected image in the memory 121, and the CPU 101 can control the ASIC 120 to read out the image.

Image information that serves as a ground tint can be stored in the memory 111 or the memory 121. The ground tint image includes an image for which image detection is possible and an image for which image detection is not possible. The image information that serves as the ground tint can be held in advance in a non-volatile manner in an HDD or the like in the memory 111 or the memory 121 of the image forming apparatus 1, or the image information can be acquired through a network, a detachable USB memory, or the like. Although the ground tint is added to the document image in the description of the embodiment, the document image can include a stamp or the like for which image detection is not possible.

The document image can be acquired through a network, a removable storage medium, or the like (print-in), and the document image can include an image for which image detection is not possible.

Figure 3:
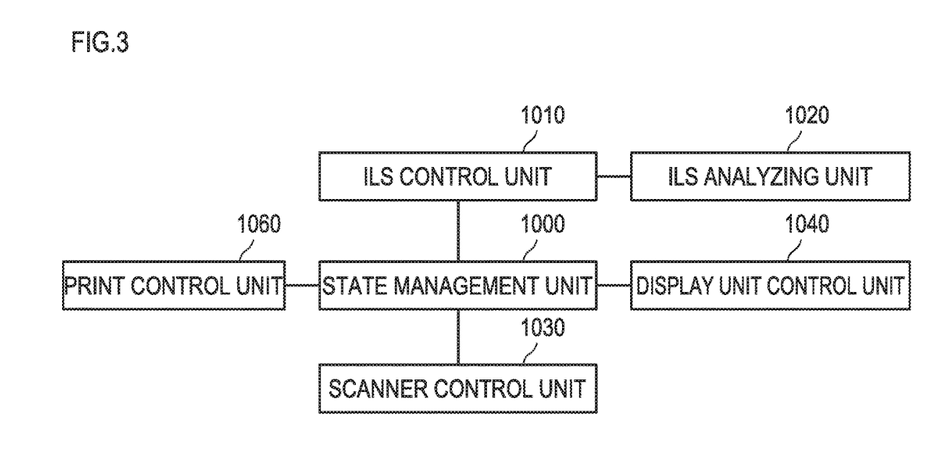
FIG. 3 is a diagram showing a block diagram of a control unit according to the embodiment of the present invention.

FIG. 3 shows functional blocks in the control unit 100.

A state management unit 1000 controls the entire image forming apparatus 1 and figures out a state of the entire image forming apparatus 1. A scanner control unit 1030 is connected to the state management unit 1000 and can be controlled. When the scanner unit 130 needs to read an image, the state management unit 1000 issues an instruction to the scanner control unit 1030 to activate the CCD 134 and the CIS 135 to read the image of the document. The state management unit 1000 executes a reading process of the read image information and stores the information as a document image in the memory.

A display unit control unit 1040 is connected to the state management unit 1000 and can be controlled. To display information on the display unit 14, the state management unit 1000 transmits a control instruction to the display unit control unit 1040, and the display unit 14 performs desirable display through the control by the display unit control unit 1040. When the display unit 14 performs operation, details of the operation are transmitted to the state management unit 1000 through the display unit control unit 1040, and the state management unit 1000 performs control according to the details of the operation.

A print control unit 1060 is connected to the state management unit 1000 and can be controlled. The print control unit 1060 controls printing, conveyance of sheets, and the like by the image forming unit 16. To perform printing, the state management unit 1000 acquires an image for printing for performing printing to create write information and transmits the write information to the print control unit 1060. The print control unit 1060 performs print operation. To combine a ground tint image with the document image to print the image, the ground tint image stored in the HDD or the like is read out and added to the document image to form an image for printing. The ground tint image includes an image for which image detection is possible and an image for which image detection is not possible.

An ILS control unit 1010 is connected to the state management unit 1000 and can be controlled. When an image printed on a sheet needs to be read, the state management unit 1000 transmits an instruction to the ILS control unit 1010, and the CCD 180 reads the image printed on the sheet. The read image is transmitted to an ILS analyzing unit 1020 to analyze image data to extract color information and position (coordinate) information of used pixels. The obtained information is sent out as a detected image to the state management unit 1000.

Note that the inline sensor 18 can detect an image according to designation by the user, conditions of a job, and the like.

The state management unit 1000 can use information of the detected image obtained by the inline sensor 18 and the information of the image for printing to determine the quality of the printed image. When the ground tint image is added to the document image, the area of the image in the ground tint image for which image detection is possible can be removed, and the information of the image for printing and the information of the detected image can be compared to determine the quality of the printed image. When the ground tint image is added to the document image, the image in the ground tint image for which image detection is not possible can be deleted from the image for printing, or only the image in the ground tint image for which image detection is possible can be added to the document image. The quality of the printed image can be determined through the comparison with the information of the detected image.

Other than the addition of the ground tint image, when the image for printing includes an image for which image detection is not possible, the image for which image detection is not possible can be deleted from the image for printing, and the quality of the printed image can be determined through the comparison with the information of the detected image.

When the ground tint image is added to the document image, the control unit determines the image for which image detection is possible and the image for which image detection is not possible in the ground tint image, and the deletion and the addition of the images are easily performed. When the image is not determined, the control unit can analyze the image to distinguish the image for which image detection is not possible from the other images.

Although the image forming apparatus body 2 includes the control unit in the description of the embodiment, the control unit can be installed outside of the image forming apparatus body 2. When the post-processing apparatus includes the image detection unit, the control unit of the image forming apparatus 1 receives the information of the image detected by the post-processing apparatus.

When the post-processing apparatus includes the image detection unit, the control unit that compares the images can be included in the post-processing apparatus. In this case, the control unit can acquire the information of the image for printing from the image forming apparatus to compare and determine the images. The result of the comparison and determination can be sent out to the image forming apparatus, and a warning or the like can be issued based on the result.

The control unit can be connected to the image forming apparatus or the post-processing apparatus through a network or the like to form an image forming system. The image forming apparatus and the post-processing apparatus can be outside of the configuration of the image forming system. In the image forming system, the control unit can acquire the information of the image for printing and the information of the detected image through the network or the like to compare and determine the images.

Although the image forming apparatus 1 includes the image detection unit in the description of the embodiment, a post-processing apparatus can include the image detection unit in an image forming system in which the post-processing apparatus is connected to the image forming apparatus.

Figure 4:
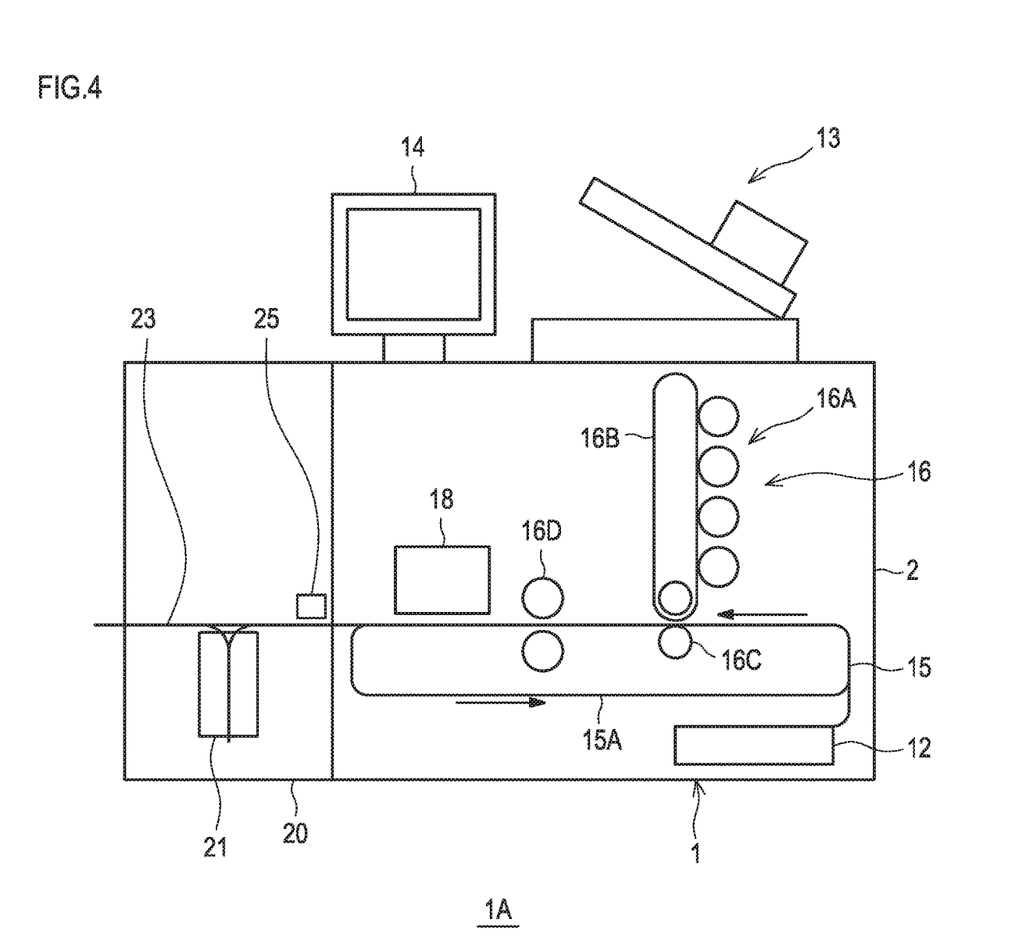
FIG. 4 is a diagram showing a mechanical outline of an image forming system according to another embodiment of the present invention.

FIG. 4 shows this embodiment, and a relay apparatus as a post-processing apparatus is connected to the image forming apparatus 1 to form an image forming system 1A. Another post-processing apparatus can be further included in a latter stage of the relay apparatus 20. The same components as in the embodiment described above are designated with the same reference signs, and the description is omitted or simplified.

The relay apparatus 20 includes a conveyance path 23 connected to the conveyance path 15. A reversing and stacking unit 21 that can reverse sheets or stack a predetermined number of sheets conveyed through the conveyance path 23 is included in the conveyance path 23. The sheets stacked by the reversing and stacking unit 21 can be conveyed to the paper discharge side at a predetermined timing. Instead of stacking the sheets in the reversing and stacking unit 21, the sheets can be conveyed toward a post-processing apparatus not shown through the conveyance path 23. The reversing and stacking unit 21 can just reverse the sheets and convey the sheets backward again.

An inline sensor 25 that detects images on the surfaces of the sheets conveyed through the conveyance path 23 in the upstream of the reversing and stacking unit 21 is arranged on the conveyance path 23. The inline sensor 25 can detect output images at a length corresponding to the maximum width of the sheets, and the inline sensor 25 can be a CCD, a CMOS, and the like arranged in a direction (for example, orthogonal direction) intersecting with the sheet conveyance direction. In this embodiment, the inline sensor 25 is equivalent to an image detection unit of the present invention.

The image detection result of the inline sensor 25 can be transmitted to the control unit of the image forming apparatus 1, and the quality of the printed image can be determined. In this case, the inline sensor 18 can be excluded from the image forming apparatus 1.

A post-processing apparatus can include a control unit that determines the quality of the printed image. Data of an image for printing, a document image, an additional image, and the like can be acquired from the image forming apparatus, and the control unit of the post-processing apparatus can determine the quality of the printed image. A communication unit that communicates with the image forming apparatus can be provided in the post-processing apparatus to acquire the data through the communication unit, and a reception unit that receives sheets can be provided in the post-processing apparatus. The reception unit can receive the sheets from the image forming apparatus through the conveyance path, and a tray that feeds the sheets can be the reception unit.

Figure 5:
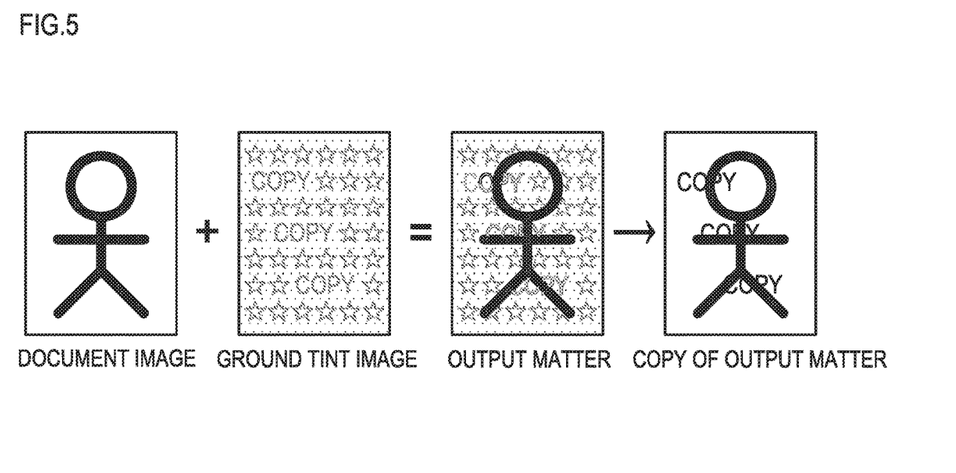
FIG. 5 is a diagram showing a document image, a ground tint image, an output image, and a copy image in ground tint printing.

FIG. 5 shows a document image, a ground tint image, an output matter (printed matter) after addition of the ground tint image to the document image, and a copy.

The document image includes a predetermined image, and image detection is possible.

The ground tint image includes a background and characters "copy". The background is an image formed by small dots, and image detection is not possible. On the other hand, the characters "copy" are an image formed by large dots, and image detection is possible.

When the ground tint image is added to the document image to print the image for printing, the background and the characters "copy" are printed along with the document image. Although the characters "copy" can be visually recognized in FIG. 5, small dots on the background actually make the characters "copy" look like a background and inconspicuous.

When a copying machine reads and prints (copies) the output matter, the dots on the background are not printed because image detection is not possible, and the characters "copy" for which image detection is possible are printed as if to be revealed.

Therefore, if the information of the image for printing and the information of the image after the detection of the output matter are compared, the image parts on the background are different, and the quality of the printed image cannot be determined. If the area of the ground tint image is removed to compare the information of the image for printing and the information of the detected image, the part of a stain is removed even if there is a stain, and the quality of the printed image cannot be determined.

In the case of the ground tint, small dots other than the printed characters (maintained dots) are not detected by scanning, and only the image to be invisible (erased dots) are compared. Alternatively, a comparison image can be created by placing only the printed characters over the document, and the entire image can be compared. This will be described below.

(Image Determination Method 1)

In a determination method, when a ground tint image is added to a document image to print the image, an area in the ground tint image for which image detection is possible is removed from an image for printing, and in this range, information of the image for printing and information of a detected image are compared to determine the quality of a printed image. Compared to the document image, the printed character part of the ground tint is different in the image read by the inline sensor. Therefore, only the printed character part of the ground tint is removed from the comparison target in this method, and the image is compared with the read image.

Figure 6:
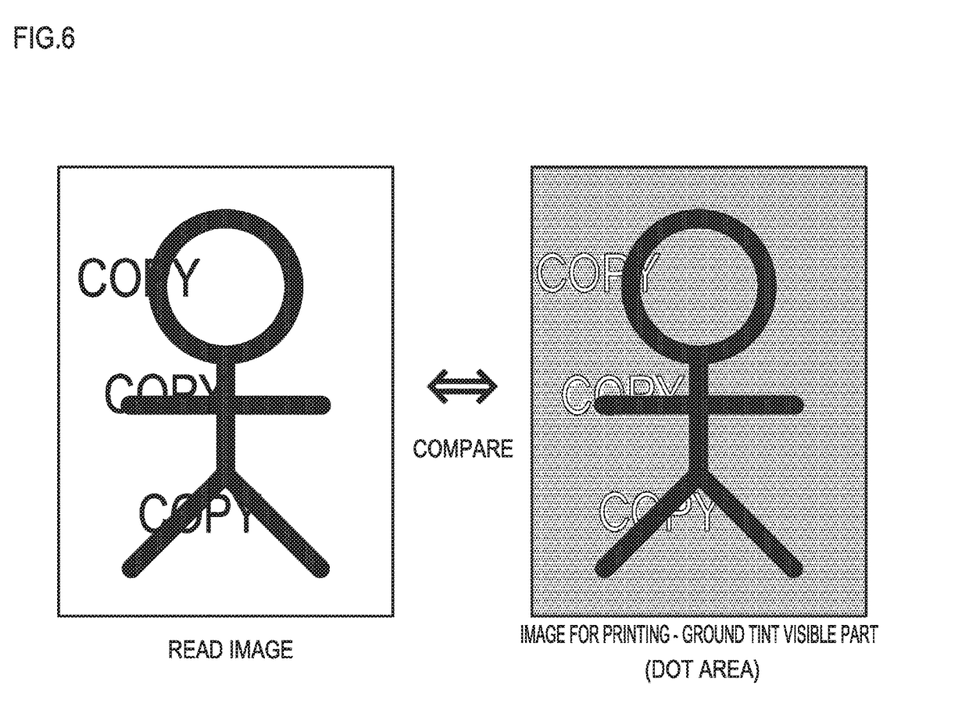
FIG. 6 is a diagram showing comparison images in a first example of an image determination method according to the present invention.

FIG. 6 shows a read image (drawing on the left) detected by the image detection unit and an image (drawing on the right) in which the image (ground tint visible part) in the ground tint for which image detection is possible is removed from the image for printing. When the area is removed in the comparison of the images, the information of the detected image does not include the information of the image in the ground tint image for which image detection is not possible. Therefore, the images can be compared in an area other than the ground tint visible image to determine the quality. If the area has a stain or the like, the compared images do not match, and it can be determined that the printed images has a poor quality.

Figure 7:
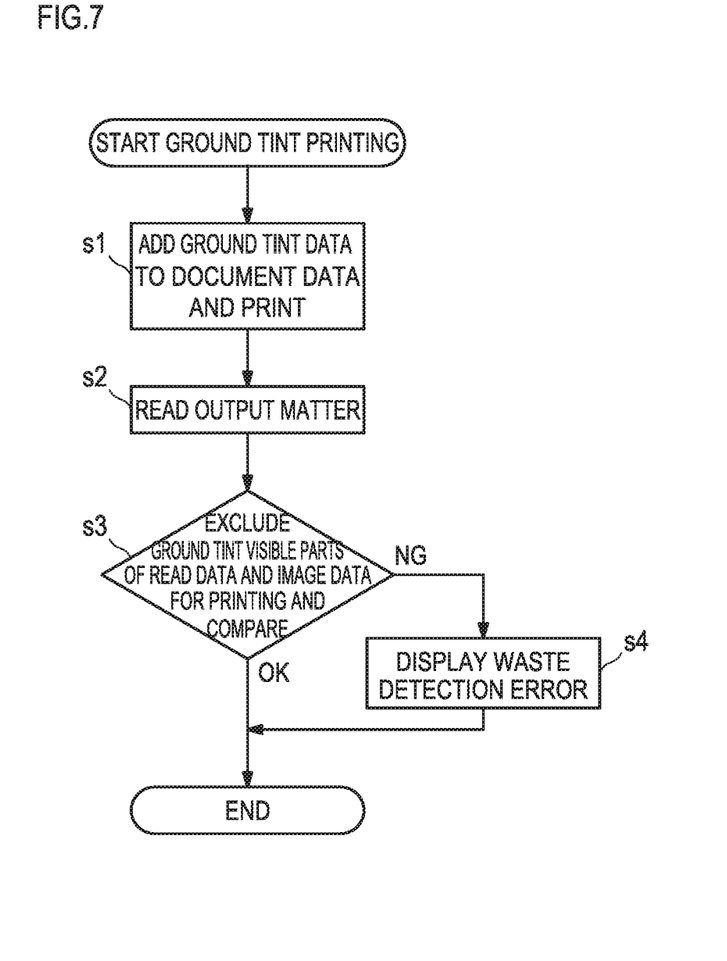
FIG. 7 is a flow chart showing a procedure of the first example of the image determination method according to the present invention.

A procedure of the image determination will be described with reference to a flow chart of FIG. 7.

First, printing is performed by adding ground tint data saved in advance in an HDD or the like to document data obtained through scanner unit input or print-in (step s1). Next, the inline sensor 18 reads an output matter (printed matter) and saves the output matter in the memory 121 (step s2).

A visible part of a ground tint image is then cleared from the corresponding part of a read image, and the visible part of the ground tint image is similarly cleared from the corresponding part of a document image. Information of the images is compared to determine whether the images match or mismatch (step s3).

As a result of the determination, if the images do not match (step s3, NG), there is a printing failure or the like. Therefore, a warning indicating generation of a waste is displayed on the display unit 14, and the printing is stopped (step s4) to end the procedure. If the images match (step s3, OK), the procedure ends. Although not shown, if the mismatch is minor, automatic correction can be fed back, instead of stopping the procedure.

Although the method has an advantage that high-speed determination is possible, a failure of the printed character part, such as omission of ground tint, cannot be detected. Furthermore, the method cannot be used much if the ground tint pattern is large.

(Image Determination Method 2)

Figure 8:
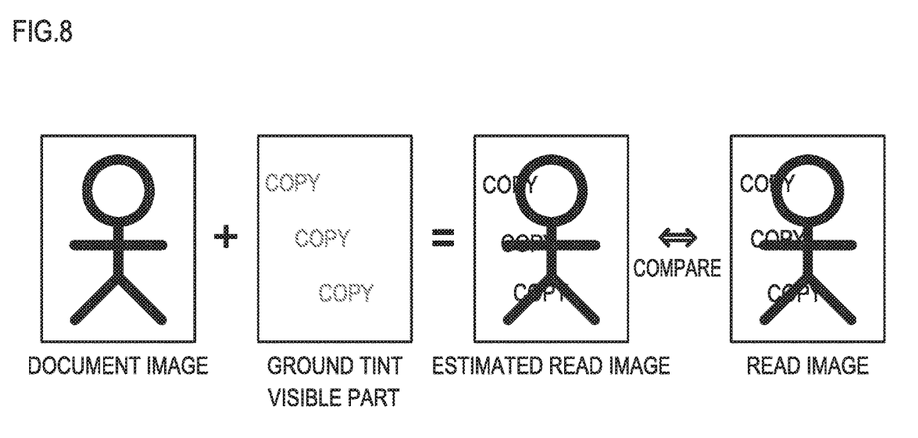
FIG. 8 is a diagram showing comparison images in a second example of the image determination method according to the present invention.

In another image determination method, only a printed character (ground tint visible part) in the ground tint for which image detection is possible is placed over the document image to create a comparison image to prepare in advance a correct image (estimated read image) to be read from the inline sensor, and the entire correct image and detected image (read image) are compared as shown in FIG. 8.

Figure 9:
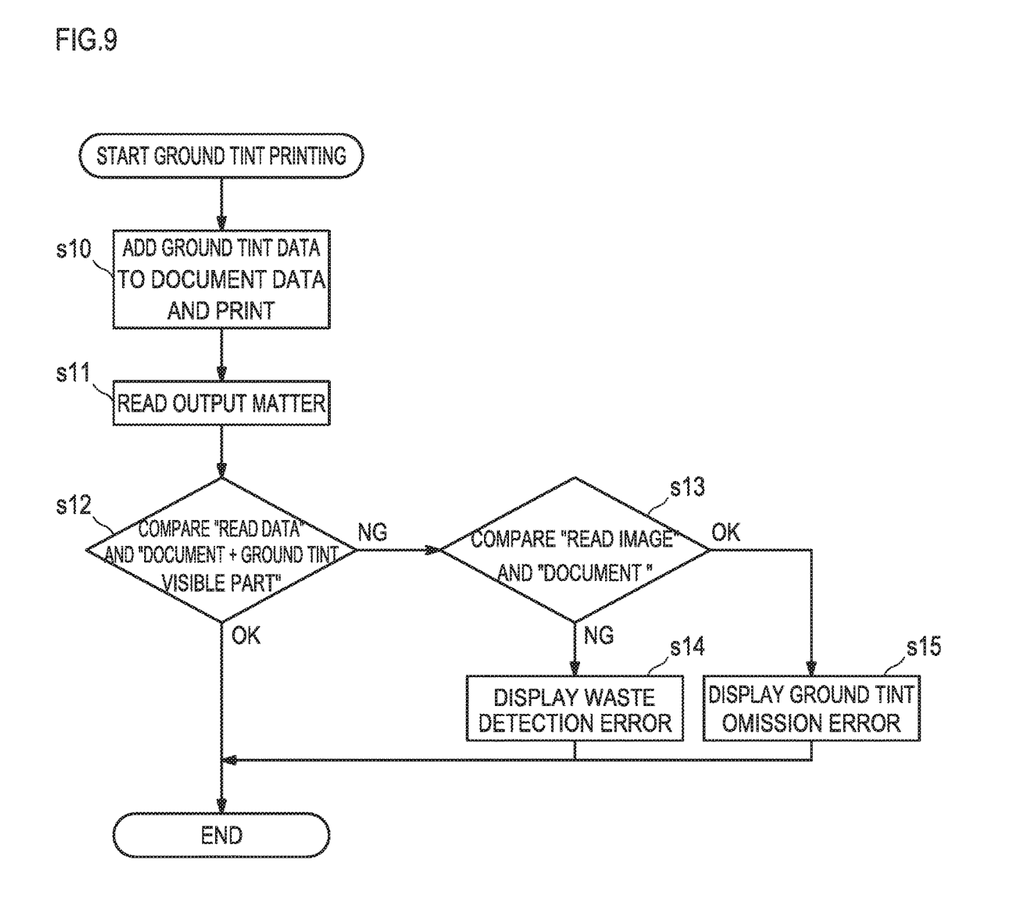
FIG. 9 is a flow chart showing a procedure of the second example of the image determination method according to the present invention.

A procedure of the determination method will be described with reference to a flow chart of FIG. 9.

Printing is performed by adding ground tint data saved in advance in an HDD or the like to document image data obtained through scanner unit input or print-in (step s10). The inline sensor 18 reads an output matter (printed matter) and saves the output matter in the memory 121 (step s11).

An image obtained by placing a visible part of a ground tint image over a document image is set as comparison information, and the entire images of the comparison information and the information of the read data are compared to determine whether the images match or mismatch (step s12).

As a result of the determination, if the images match (step s12, OK), the procedure ends. If the images do not match (step s12, NG), the document image and the read data are compared to determine whether the images match or mismatch (step s13).

If the images do not match (step s13, NG), there is a printing failure or the like. Therefore, generation of a waste is displayed on the display unit 14, and the printing is stopped (step s14) to end the procedure. If the mismatch is minor, automatic correction can be fed back, instead of stopping the printing.

If the images match (step s13, OK), there is omission of ground tint data due to a defect of program, an HDD read error, or the like. Therefore, an error indicating the omission of ground tint is displayed on the display unit 14, and the printing is stopped (step s15) to end the procedure.

In the image forming method, the entire images can be strictly checked to determine a printing failure or omission of ground tint. However, the processing speed is slow.

The image determination method 1 and the image determination method 2 can be switched. In this case, the image determination method 1 is a first determination function, and the image determination method 2 is a second determination function.

The switch can be performed according to the content of the image for printing. For example, the switch is possible based on the following conditions.

Determine by the size of the character area.

The second determination function reduces the performance because the comparison image is created.

The first determination function increases the performance because the comparison area is reduced.

User selects based on the performance.

Switch according to the type of the document image.

Switch according to the ground tint pattern.

The conditions for switching are not limited to these. An appropriate method can be selected, or the user can select a method through the display unit 14.

Figure 10:
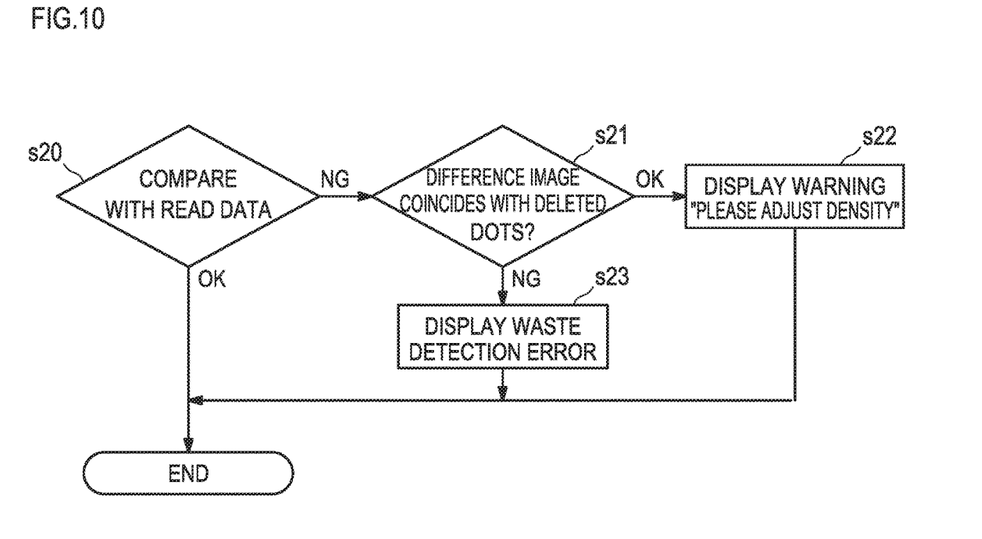
FIG. 10 is a flow chart showing a restoration procedure after image determination according to the present invention.

A flow chart of FIG. 10 illustrates a restoration method started based on the determination of step s3 or step s12 when the images mismatch.

Figure 11:
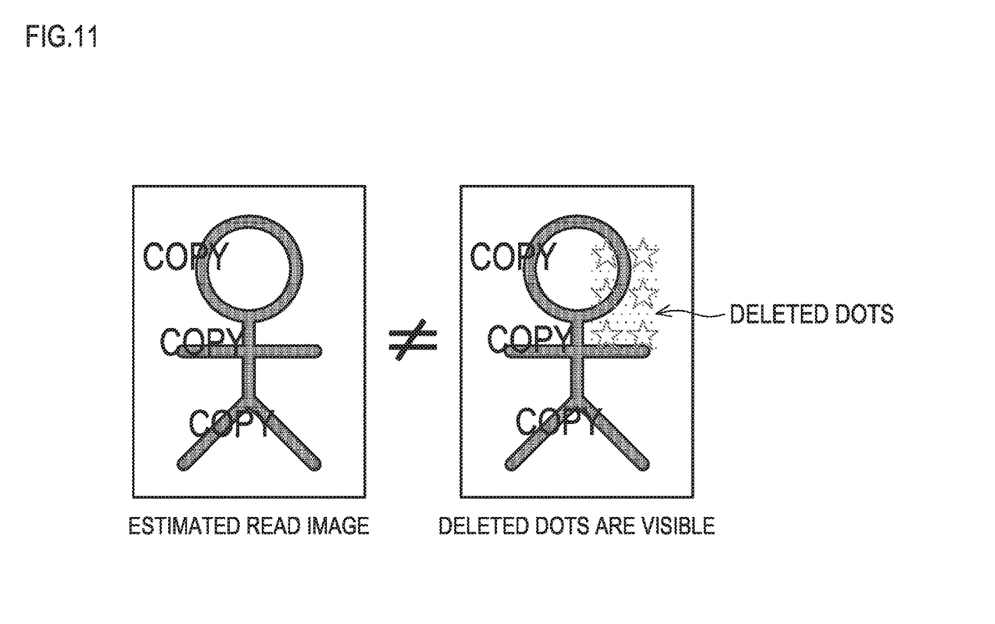
FIG. 11 is a diagram showing an example of comparison images determined in the restoration procedure.

If the determination is OK in the determination of step s3 or step s12 (step s20), the procedure ends. If the determination is NG, the restoration method is started from here. If the determination is NG, whether a difference image partially or entirely coincides with the deleted dots is determined (step s21). If the difference image does not coincide with the deleted dots (step s21, NG), it is determined that a waste is detected, and an error is displayed on the display unit 14 (step s23). If the difference image partially or entirely coincides with the deleted dots (step s21, OK), the ground tint background is not completely deleted as shown in a drawing on the right in FIG. 11, and the deleted dots are visible. Therefore, a warning for prompting for adjusting the density is displayed (step s22). Alternatively, the density is automatically adjusted.

The present embodiment has an advantageous effect that a waste and the like of a printed image can be determined based on information of a printed image and information of an image for printing when the image for printing includes an image for which image detection is not possible.

Although the present invention has be described based on the embodiment, appropriate changes can be made without departing from the present invention.

An aspect of the present invention provides a post-processing apparatus including:

a reception unit that receives information of an image for printing;

a transfer medium reception unit that receives a transfer medium on which the image for printing is printed;

an image detection unit that detects an image printed on the transfer medium; and a control unit that acquires information of the image detected by the image detection unit, wherein the control unit has a determination function used when an image that can be detected by the image detection unit and an image that cannot be detected by the image detection unit are added to a document image to form the image for printing, the determination function being adapted to remove an area of the image that can be detected by the image detection unit and to determine a state of the printed image based on comparison of the information of the detected image and the information of the image for printing.

Another aspect of the present invention provides a post-processing apparatus including:

a reception unit that receives information of an image for printing;

a transfer medium reception unit that receives a transfer medium on which the image for printing is printed;

an image detection unit that detects an image printed on the transfer medium; and a control unit that acquires information of the image detected by the image detection unit, wherein the control unit has a determination function used when the image for printing includes an image that cannot be detected by the image detection unit, the determination function being adapted to set, as comparison information, information of an image obtained by excluding the image that cannot be detected by the image detection unit from the image for printing and to determine a state of the printed image based on comparison of the information of the detected image and the comparison information.

An aspect of the present invention provides an image forming system including a control unit that acquires an image for printing for performing printing on a transfer medium by an image forming unit and information of an image detected by an image detection unit that detects an image of a transfer medium on which the image is printed by the image forming unit based on the image for printing, wherein the control unit has a determination function used when the image for printing is an image obtained by adding an image for which image detection is possible and an image for which image detection is not possible to a document image, the determination function being adapted to remove an area of the image for which image detection is possible and to determine a state of the printed image based on comparison of the information of the detected image and information of the image for printing.

Another aspect of the present invention provides an image forming system including a control unit that acquires an image for printing for performing printing on a transfer medium by an image forming unit and information of an image detected by an image detection unit that detects an image of a transfer medium on which the image is printed by the image forming unit based on the image for printing, wherein the control unit has a determination function used when the image for printing includes an image for which image detection is not possible, the determination function being adapted to set, as comparison information, information of an image obtained by excluding the image that cannot be detected by the image detection unit from the image for printing and to determine a state of the printed image based on comparison of the information of the detected image and the comparison information.

An aspect of the present invention provides the image forming system according to the aspects, further including:

a conveying unit that conveys a transfer medium;

an image forming unit that prints an image on the transfer medium based on an image for printing; and an image detection unit that detects the image printed on the transfer medium.

An aspect of the present invention provides an image determination method including:

a step of acquiring an image for printing for performing printing on a transfer medium by an image forming unit;

a step of acquiring information of an image detected by an image detection unit that detects an image of the transfer medium on which the image is printed based on the image for printing; and a determination step executed when the image for printing is an image obtained by adding an image for which image detection is possible and an image for which image detection is not possible to a document image, the determination step adapted to remove an area of the image for which image detection is possible and to determine a state of the printed image based on comparison of the information of the detected image and information of the image for printing.

An aspect of the present invention provides an image forming system according to the aspects, the system including:

a step of acquiring an image for printing for performing printing on a transfer medium by an image forming unit;

a step of acquiring information of an image detected by an image detection unit that detects an image of the transfer medium on which the image is printed based on the image for printing; and a determination step executed when the image for printing includes an image for which image detection is not possible, the determination step adapted to set, as comparison information, information of an image obtained by excluding the image for which image detection is not possible from the image for printing and to determine a state of the printed image based on comparison of the information of the detected image and the comparison information.

What is claimed is:

1. An image forming apparatus comprising:
a conveying unit that conveys a transfer medium;
an image forming unit that prints an image on the transfer medium based on an image for printing; and
a control unit that receives a detection result of an image detection unit that detects the image printed on the transfer medium,
wherein:
the image detection unit comprises an image sensor having a minimum detectable dot size,
an image for which image detection by the image detection unit is not possible is an image which is made up of dots which are smaller than the minimum detectable size of the image sensor of the image detection unit, and
the control unit has a determination function used when an image for which image detection by the image detection unit is possible and an image for which image detection by the image detection unit is not possible are added to a document image to form the image for printing, the determination function being adapted to exclude an area of the image for which image detection is possible, to compare (i) information of the detected image from which the area of the image for which image detection is possible is excluded and (ii) information of the image for printing from which the area of the image for which image detection is possible is excluded, and to determine a print quality of the printed image based on the comparison of the information of the detected image and the information of the image for printing.

2. The image forming apparatus according to claim 1, wherein the control unit issues a warning when an image for which image detection is predicted to be not possible is detected in the determination of the image.

3. The image forming apparatus according to claim 1, further comprising the image detection unit, wherein the image detection unit detects an image printed on the transfer medium at a position downstream of the image forming unit in a conveyance direction.

4. An image forming apparatus comprising:
a conveying unit that conveys a transfer medium;
an image forming unit that prints an image on the transfer medium based on an image for printing; and
a control unit that receives a detection result of an image detection unit that detects the image printed on the transfer medium,
wherein:
the image detection unit comprises an image sensor having a minimum detectable dot size,
an image for which image detection by the image detection unit is not possible is an image which is made up of dots which are smaller than the minimum detectable size of the image sensor of the image detection unit, and
the control unit has a determination function used when the image for printing includes an image for which image detection by the image detection unit is not possible, the determination function being adapted to set, as comparison information, information of an image obtained by excluding the image for which image detection is not possible from the image for printing, to compare information of the detected image and the comparison information, and to determine a print quality of the printed image based on the comparison of the information of the detected image and the comparison information.

5. The image forming apparatus according to claim 4, wherein the control unit sets, as the comparison information, information of an image obtained by erasing the image for which image detection is not possible from the image for printing.

6. The image forming apparatus according to claim 4, wherein an image for which image detection is possible and an image for which image detection is not possible are added to a document image to form the image for printing.

7. The image forming apparatus according to claim 6, wherein the image for which image detection is possible and the image for which image detection is not possible are ground tint images.

8. The image forming apparatus according to claim 6, wherein the control unit sets, as the comparison information, an image in which the image for which image detection is not possible is not added to the document image.

9. The image forming apparatus according to claim 8, wherein the control unit compares the information of the detected image and information of the document image when the image is determined to have a defect, and the control unit determines that printing of the detected image has a defect when the control unit determines that the images match.

10. The image forming apparatus according to claim 4, wherein the control unit issues a warning when an image for which image detection is predicted to be not possible is detected in the determination of the image.

11. The image forming apparatus according to claim 4, further comprising the image detection unit, wherein the image detection unit detects an image printed on the transfer medium at a position downstream of the image forming unit in a conveyance direction.

12. An image forming apparatus comprising:
a conveying unit that conveys a transfer medium;
an image forming unit that prints an image on the transfer medium based on an image for printing; and
a control unit that receives a detection result of an image detection unit that detects the image printed on the transfer medium, wherein
the image detection unit comprises an image sensor having a minimum detectable dot size,
an image for which image detection by the image detection unit is not possible is an image which is made up of dots which are smaller than the minimum detectable size of the image sensor of the image detection unit, and
the control unit has a first determination function used when an image for which image detection by the image detection unit is possible and an image for which image detection by the image detection unit is not possible are added to a document image to form the image for printing, the first determination function adapted to remove an area of the image for which image detection is possible, to compare (i) information of the detected image from which the area of the image for which image detection is possible is removed and (ii) information of the image for printing from which the area of the image for which image detection is possible is removed, and to determine a print quality of the printed image based on the comparison of the information of the detected image and the information of the image for printing,
the control unit has a second determination function used when the image for printing includes an image for which image detection is not possible, the second determination function adapted to set, as comparison information, information of an image obtained by excluding the image for which image detection is not possible from the image for printing, to compare information of the detected image and the comparison information, and to determine a print quality of the printed image based on the comparison of the information of the detected image and the comparison information, and
the control unit can select the first determination function and the second determination function.

13. The image forming apparatus according to claim 12, wherein the control unit sets, as the comparison information, information of an image obtained by erasing the image for which image detection is not possible from the image for printing.

14. The image forming apparatus according to claim 12, wherein an image for which image detection is possible and an image for which image detection is not possible are added to a document image to form the image for printing.

15. The image forming apparatus according to claim 14, wherein the image for which image detection is possible and the image for which image detection is not possible are ground tint images.

16. The image forming apparatus according to claim 14, wherein the control unit sets, as the comparison information, an image in which the image for which image detection is not possible is not added to the document image.

17. The image forming apparatus according to claim 16, wherein the control unit compares the information of the detected image and information of the document image when the image is determined to have a defect, and the control unit determines that printing of the detected image has a defect when the control unit determines that the images match.

18. The image forming apparatus according to claim 12, wherein the control unit issues a warning when an image for which image detection is predicted to be not possible is detected in the determination of the image.

19. The image forming apparatus according to claim 12, further comprising the image detection unit, wherein the image detection unit detects an image printed on the transfer medium at a position downstream of the image forming unit in a conveyance direction.

* * * * *